United States Patent
Velhner et al.

(10) Patent No.: US 7,154,248 B2
(45) Date of Patent: Dec. 26, 2006

(54) CONTROL SYSTEM FOR AN ELECTRIC MACHINE

(75) Inventors: Aleks Velhner, Richmond (CA); Neil Garfield Allyn, Vancouver (CA); Terry Moreau, West Vancouver (CA)

(73) Assignee: Teleflex Canada Inc., Richmond (CA)

( * ) Notice: Subject to any disclaimer, the term of this patent is extended or adjusted under 35 U.S.C. 154(b) by 118 days.

(21) Appl. No.: 10/891,228

(22) Filed: Jul. 15, 2004

(65) Prior Publication Data

US 2006/0012344 A1   Jan. 19, 2006

(51) Int. Cl.
*H02P 9/00* (2006.01)
*G05F 1/40* (2006.01)

(52) U.S. Cl. .................... 322/24; 323/284; 323/282; 363/34; 363/41

(58) Field of Classification Search ............. 290/40 R, 290/40 B; 322/23, 24, 37, 44, 25, 27, 28; 323/284, 34, 282; 363/67, 85, 34, 41
See application file for complete search history.

(56) References Cited

U.S. PATENT DOCUMENTS

| | | | |
|---|---|---|---|
| 4,174,497 A * | 11/1979 | Depenbrock | 323/211 |
| 4,275,344 A | 6/1981 | Mori | |
| 4,319,173 A | 3/1982 | Rhodes | |
| 4,358,818 A * | 11/1982 | Rosa | 363/46 |
| 4,547,843 A * | 10/1985 | Hucker | 363/67 |
| 4,718,012 A | 1/1988 | Oshiage | |
| 5,298,845 A | 3/1994 | DeBoer | |
| 5,493,488 A | 2/1996 | Castle | |
| 5,534,766 A * | 7/1996 | Bonissone et al. | 323/235 |

(Continued)

*Primary Examiner*—Nicholas Ponomarenko

(74) *Attorney, Agent, or Firm*—Norman M. Cameron

(57) ABSTRACT

There is provided an adjustable integral component in a feedback loop of a closed loop control system. The closed loop control system controls an output signal of an electric generator. The adjustable integral component provides an integral signal. The integral signal is proportional to the output signal in a first operational mode. The integral signal is proportional to a time integral of an output signal in a second operational mode. According to another aspect of the invention there is provided a non-linear component in a feedback loop of a closed loop control system. The closed loop control system controls an output signal of an electric generator. The electric generator having non-linear characteristics. The feedback loop has an error signal, of which the output signal is responsive to. The non-linear component receives a load signal and provides a non-linear signal related to the non-linear characteristics of the electric generator. The error signal is responsive to the non-linear signal. According to another aspect of the invention, there is provided a method of controlling a system variable in a control system for an electric generator. The output signal of the electric generator is sensed and a sample signal is provided thereof. The sample signal is compared to be below a threshold value, and accordingly an adjustable impedance is adjusted to be substantially resistive. A proportional signal and integral signal that are proportional to the sample signal are provided. A time derivative is taken of the sample signal to provide a differential signal. An error signal is generated by providing a difference between a reference signal and a sum of the proportional signal, the integral signal and the differential signal. The output signal is then adjusted based on the error signal, by driving the output signal towards the set-point value. The sample signal is then compared to be above the threshold value, and accordingly the adjustable impedance is adjusted to be substantially capacitive. The integral signal now being representative of a time integral of the sample signal.

14 Claims, 14 Drawing Sheets

U.S. PATENT DOCUMENTS 5,952,817 A * 9/1999 Brewster et al. ............ 323/268
6,150,802 A * 11/2000 Andrews .................... 323/282
6,166,928 A * 12/2000 Chandorkar ................. 363/34
6,445,169 B1 * 9/2002 Schultz et al. ............. 323/284

* cited by examiner

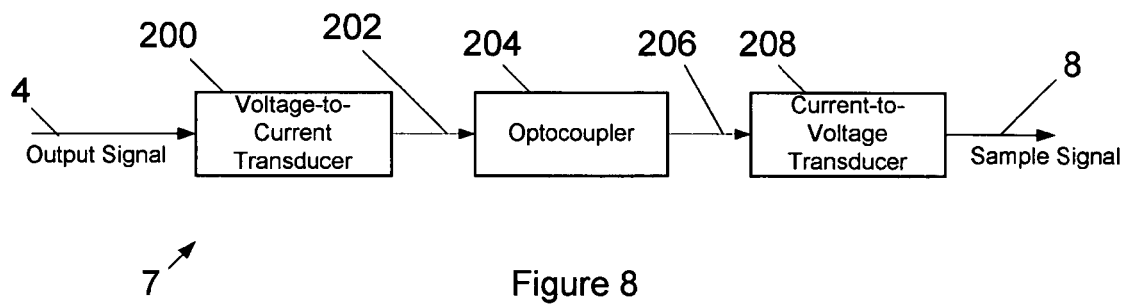
Figure 8
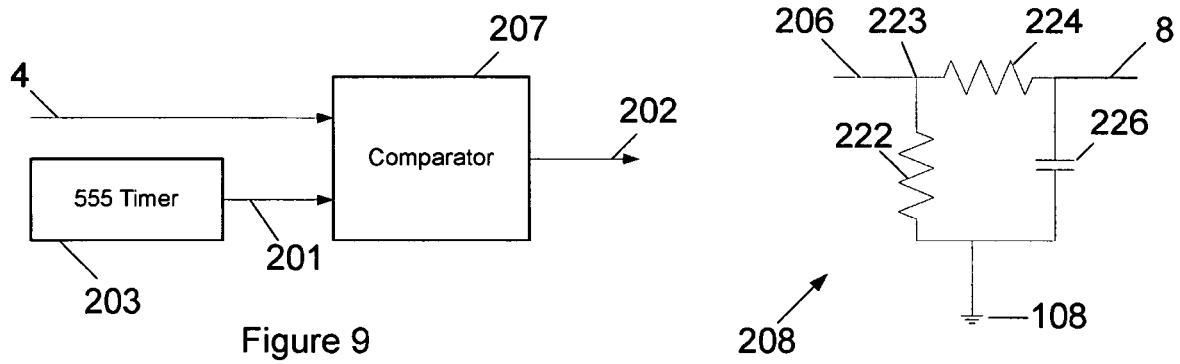
Figure 9
Figure 10

CONTROL SYSTEM FOR AN ELECTRIC MACHINE

BACKGROUND OF THE INVENTION

1. Field of the Invention

The present invention relates to a closed loop control system used in electric machines, and in particular electric generators. The control system is used to maintain an output voltage of the electric generator at a set-point value in a steady state condition. Additionally, the control system provides a timely response to changes in output voltage under transient conditions, such as a change in load or generator speed, to restore the output voltage to the set-point value.

2. Description of the Related Art

Various circuits have been introduced for use in closed loop control systems. As an example, U.S. Pat. No. 5,298,845 issued Mar. 29, 1994 to David P. DeBoer et al. describes a proportional plus integral controller operating an actuator in an HVAC system. This controller enables an integral part of a PI controller only when the error signal exceeds a predetermined value. A disadvantage of this method is that it does not use the output signal, in the case of the a DC generator the output voltage, to control the integral part of the PI controller. Instead, it controls the integral part based on a value of an error signal in relation to a threshold value. It is desirable to disable the integral portion of a PID controller during startup of the electric generator when the error signal has a maximum value and the output voltage is slowly rising to its set-point value. However, after startup it is desirable to include the integral portion of the controller even when the error signal has a maximum value, such as occurs when going from full load to no load, or vice versa.

BRIEF SUMMARY OF THE INVENTION

According to one aspect of the invention, there is provided a control system for an electric generator for adjusting the value of a system variable. The system variable has a set-point value and the electric generator has an output signal. There is a sensing means for sensing the output signal and providing a sample signal. There is a proportional means and derivative means that receive the sample signal and provide a proportional signal and differential signal respectively. There is an integral control means that receives the sample signal and provides a control signal, the control signal selecting between a first operational mode and a second operational mode. There is an integral means that receives the sample signal and the control signal and provides an integral signal. There is a reference signal means that provides a reference signal representative of the set-point value. There is a nonlinear means that provides a nonlinear signal. There is an error generating means that provides an error signal. The error signal is representative of a difference between the reference signal and a sum of the proportional signal, the integral signal, the differential signal and the nonlinear signal. The nonlinear signal is related to the error signal by a nonlinear function. The electric generator receives the error signal and adjusts the output signal such that the system variable approaches the set-point value.

According to another aspect of the invention there is provided a combination electric generator and a control system for adjusting the value of a system variable. The system variable has a set-point value and the electric generator has an output signal. There is an excitation driver assembly providing an excitation control signal and an excitation signal. There is an excitation winding assembly receiving the excitation signal and providing an excitation field. There is an armature winding assembly coupling energy from the excitation field and providing a generated signal. There is a rectifier and filter assembly that receives the generated signal and provides the output signal. There is a signal sensing circuit that receives the output signal and provides a sample signal. There is an operational amplifier having an inverting input, a non-inverting input and an output. There is a proportional component and a derivative component connected between the sample signal and the inverting input having a resistive impedance and capacitive impedance respectively. There is an integral control component that receives the sample signal and provides a control signal. The control signal selects between a first operational mode and a second operational mode. There is a nonlinear component that receives the excitation control signal and provides a nonlinear signal. There is an integral component connected between the output and the inverting input. The integral component further receives the non-linear signal and the control signal. The integral component has an adjustable impedance. There is a reference signal component connected to the non-inverting input. The output provides an error signal. The excitation driver receives the error signal and adjusts the excitation signal such that the output signal varies so that the system variable approaches the set-point value.

According to another aspect of the invention, there is provided a PID controller in a closed loop control system that controls an output signal of an electric generator. The PID controller comprises a proportional component, an integral component, a derivative component and an integral control component. The proportional component provides a proportional signal proportional to the output signal. The integral component provides an integral signal. The derivative component provides a differential signal proportional to a time differential of the output signal. The integral control component is operable to select between a first operational mode and a second operational mode. The integral signal is substantially proportional to the output signal in the first operational mode. The integral signal is proportional to a time integral of the output signal in the second operational mode.

According to another aspect of the invention there is provided a PID controller in a feedback loop of a closed loop control system that controls an output signal of an electric generator. The PID controller comprises a proportional component having a proportional gain coefficient, an integral component having an integral gain coefficient, a derivative component having a differential gain coefficient, and a non-linear component providing a non-linear signal. The non-linear signal is related to non-linear effects in the generator. The non-linear signal is operable to adjust the proportional gain coefficient, the integral gain coefficient and the differential gain coefficient to optimize feedback loop damping over a range of loads.

According to another aspect of the invention there is provided an adjustable integral component in a feedback loop of a closed loop control system. The closed loop control system controls an output signal of an electric generator. The adjustable integral component provides an integral signal. The integral signal is proportional to the output signal in a first operational mode. The integral signal is proportional to a time integral of an output signal in a second operational mode.

According to another aspect of the invention there is provided a non-linear component in a feedback loop of a closed loop control system. The closed loop control system controls an output signal of an electric generator. The electric generator having non-linear characteristics. The feedback loop has an error signal, of which the output signal is responsive to. The non-linear component receives a load signal and provides a non-linear signal related to the non-linear characteristics of the electric generator. The error signal is responsive to the non-linear signal.

According to another aspect of the invention, there is provide a method of controlling a system variable in a control system for an electric generator. The system variable has a set-point value and the electric generator has an output signal. The method comprises sensing the output signal and providing a sample signal representative thereof. Providing a proportional signal proportional to the sample signal. Integrating the sample signal and providing an integral signal. Differentiating the sample signal and providing a differential signal. Providing a nonlinear signal representative of a nonlinear effect in the generator. Providing a reference signal representative of a set-point value of the system variable. Generating an error signal by providing a difference between the reference signal and a sum of the proportional signal, the integral signal, the differential signal and the nonlinear signal. Adjusting the output signal by applying the error signal to the generator. The output signal is adjusted until the difference has a zero value and accordingly the system variable equals the set-point value.

According to another aspect of the invention there is provided a method of controlling a system variable in a control system for an electric generator. The system variable has a set-point value and the electric generator has an output signal. The method comprises sensing the output signal and providing a sample signal representative thereof. Determining that the sample signal is below a threshold value. Adjusting an adjustable impedance to be substantially resistive. Providing a proportional signal proportional to the sample signal. Providing an integral signal that is proportional to the sample signal. Differentiating the sample signal and providing a differential signal. Providing a reference signal representative of a set-point value of the system variable. Generating an error signal by providing a difference between the reference signal and a sum of the proportional signal, the integral signal and the differential signal. Adjusting the output signal by applying the error signal to the generator. The output signal being adjusted such that the system variable approaches the set-point value. Determining that the sample signal is above a threshold value. Adjusting the adjustable impedance to be substantially capacitive. Providing the integral signal that is representative of a time integral of the sample signal.

BRIEF DESCRIPTION OF THE DRAWINGS

The present invention will be more readily understood from the following description of preferred embodiments thereof given, by way of example, with reference to the accompanying drawings, in which:

FIG. 8 is a block diagram of an embodiment of the signal sensing circuit of the embodiment of FIG. 1.

FIG. 9 is a circuit schematic of an embodiment of the voltage-to-current transducer in the signal sensing circuit of the embodiment of FIG. 1.

FIG. 10 is a circuit schematic of an embodiment of the current-to-voltage transducer in the signal sensing circuit of the embodiment of FIG. 1.

DESCRIPTION OF THE PREFERRED EMBODIMENTS

Figure 1:
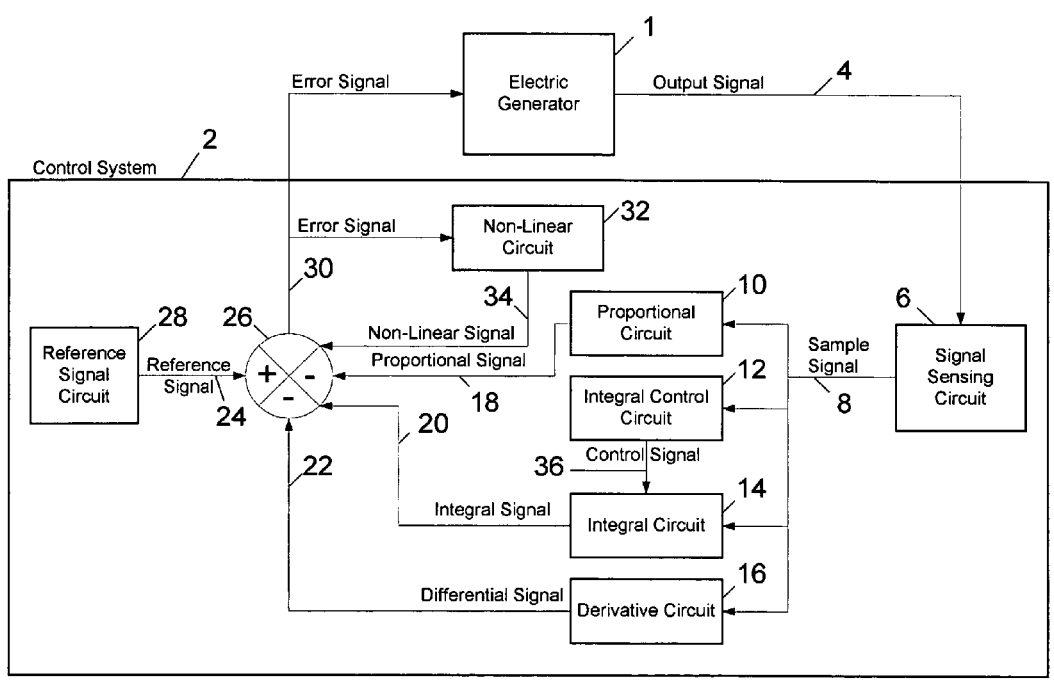
FIG. 1 is a block diagram of a preferred embodiment of the control system and electric generator.

FIG. 1 shows a preferred embodiment of a control system 2. According to the present invention, an electric generator 1 provides an output signal 4. The output signal 4 in the present embodiment is a DC voltage signal that has a set-point value. The controlling elements within the control system 2 include a proportional means 10, an integral means 14, and a derivative means 16, together forming a PID feedback control element. In other embodiments of the invention, the control system 2 may comprise the integral means 14 and not the proportional means 10 and derivative means 16, or the proportional means 10 and the integral means 14 and not the derivative means 16, or the derivative means 16 and the integral means 14 and not the proportional means 10. An integral control means 12 serves to control integral means 14. Additionally, a non-linear means 32 provides a further element of control by counteracting non-linear effects within the electric generator, as will be discussed below.

A sensing means 6 senses the output signal 4 and provides a sample signal 8, which is an output voltage feedback signal. The sample signal 8 is representative of the output signal 4. In the present embodiment the sensing means 6 is a signal sensing circuit 7 having a structure illustrated In FIGS. 8–10. FIG. 8 shows a block diagram of components of the signal sensing circuit shown generally by reference numeral 7. The output signal 4 is received by a voltage-to-current transducer circuit 200, which generates an intermediate pulsed current signal 202. The intermediate pulsed current signal 202 is received by an optocoupler 204, which provides galvanic isolation between the output signal 4 and the sample signal 8.

As is commonly known in the industry, and so is not shown further in the drawings, an optocoupler comprises an input light emitting diode (LED) and an output phototransistor, such as in part number CNY17-4 manufactured by Agilent Technologies Inc. In the present example, the input LED receives the intermediate pulsed current signal 202 and transforms this signal into a stream of photons received by the phototransistor. The phototransistor transforms the stream of photons into a second pulsed current signal 206.

The second pulsed current signal 206 is received by a current-to-voltage transducer circuit 208 that transforms the second pulsed current signal 206 into the sample signal 8.

In the present embodiment, the voltage-to-current transducer 200 has the structure illustrated in FIG. 9. A comparator 207 receives the output signal 4 and a timing signal 201 from a timer circuit 203. The timer circuit 203 is based on a 555 timer which is common in the industry. The timing signal 201 oscillates above and below the output signal 4, creating a pulsed comparator output providing the intermediate pulsed signal 202. The output signal 4 is used to vary the duty cycle of the pulses.

The current-to-voltage transducer 208 has the structure illustrated in FIG. 10. A resistor 222 is connected between the second pulsed current signal 206 and a ground 108. A resistor 224 is connected between the second pulsed current signal 206 and a capacitor 226, and the capacitor 226 is further connected to the ground 108. With respect to the second pulsed current signal 206, the impedance towards resistor 224 is greater than towards resistor 222. Therefore, most of the second pulsed current signal 206 flows through the resistor 222. A voltage drop 223 is thereby created across resistor 222. The voltage drop 223 is low pass filtered by resistor 224 and capacitor 226, creating sample signal 8.

The proportional means 10, shown in FIG. 1, receives the sample signal 8 and provides a proportional signal 18. The proportional signal 18 is proportional to sample signal 10. In the present embodiment the proportional means 10 is a proportional circuit having a structure illustrated in FIG. 6. In other embodiments the proportional means 10 can be a proportional algorithm executed in a controller such as a microcontroller or a digital signal processor.

Figure 6:
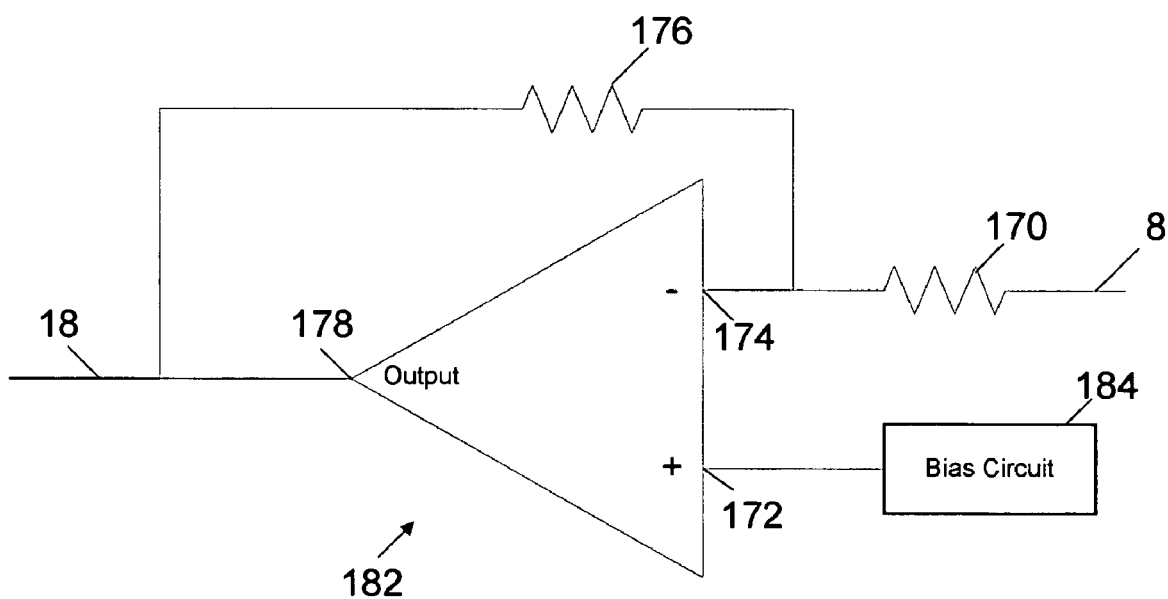
FIG. 6 is a circuit schematic of an embodiment of the proportional circuit of the embodiment of FIG. 1.

FIG. 6 shows an operational amplifier, indicated generally by reference numeral 182, having a non-inverting input 172, an inverting input 174 and an output 178. A resistor 170 is connected between sample signal 8 and inverting input 174. Another resistor 176 is connected between inverting input 174 and output 178. The output provides the proportional signal 18. A bias circuit 184 is connected to non-inverting input 172. The bias circuit 184 serves to provide a DC bias value to the proportional signal 18. The proportional signal 18 is related to the sample signal by a ratio of the value of resistor 176 to the value of resistor 170.

The integral control means 12, shown in FIG. 1, receives the sample signal 8 and provides a control signal 36. The control signal 36 selects between a first operational mode and a second operational mode. In the present embodiment the integral control means 12 is an integral control circuit having a structure illustrated in FIG. 3. In other embodiments the integral control means 12 can be an integral control algorithm executed in the controller.

Figure 3:
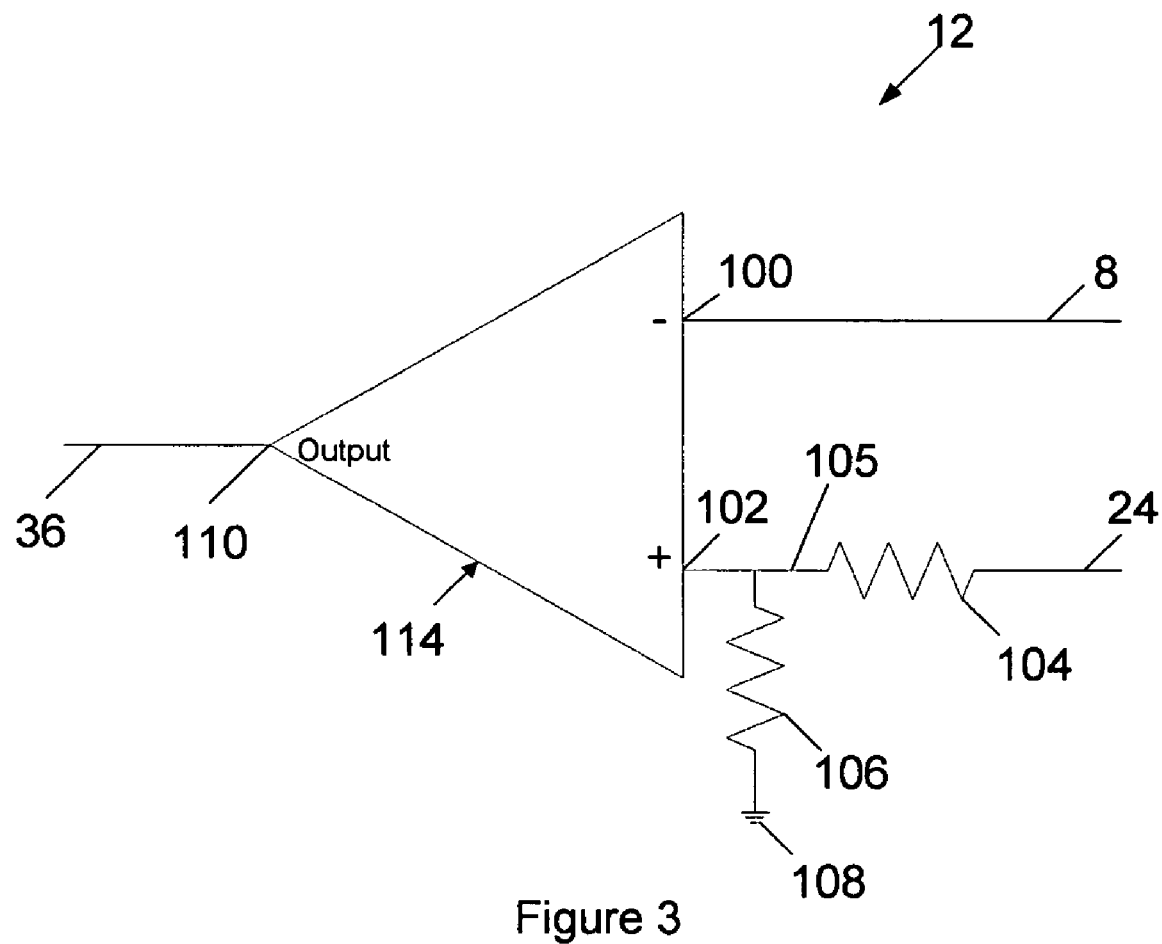
FIG. 3 is a circuit schematic of an embodiment integral control circuit of the embodiment of FIG. 1.

An operational amplifier, shown in FIG. 3 and indicated generally by reference numeral 114, is in a comparator configuration. Operational amplifiers are common in the industry and are used extensively in electronic circuits, the characteristics of operational amplifiers will therefore not be discussed further herein. An example of an operational amplifier is part number LM2904 manufactured by National Semiconductor Corporation.

The operational amplifier 114 has an inverting input 100, a non-inverting input 102 and an output 110. The sample signal 8 is received by the inverting input 100. A resistor 104 is connected between a reference signal 24 and the non-inverting input 102. A resistor 106 is connected between non-inverting input 102 and ground 108. Resistors 104 and 106 form a voltage divider that divides the reference voltage 24 into a threshold voltage 105.

When the sample signal 8 is less than the threshold voltage 105, the output 110 drives the control signal 36 to a high value. The high value is typically close to or equal with a power supply voltage of the operational amplifier 114. This high value determines the first operational mode of the control system.

When the sample signal 8 is greater than the threshold voltage 105, the output 110 drives the control signal 36 to a low value. The low value is typically close to or equal with ground 108. This low value determines the second operational mode of the control system.

The integral means 14, shown in FIG. 1, receives the sample signal 8 and the control signal 36 and provides an integral signal 20. In the first operational mode the integral signal 20 is proportional to the sample signal 8. In the second operational mode the integral signal 20 is representative of a time integral of the sample signal. In the present embodiment the integral means 14 is an integral circuit having a structure illustrated in FIG. 4. In other embodiments the integral means 14 can be an integral algorithm executed in the controller.

Figure 4:
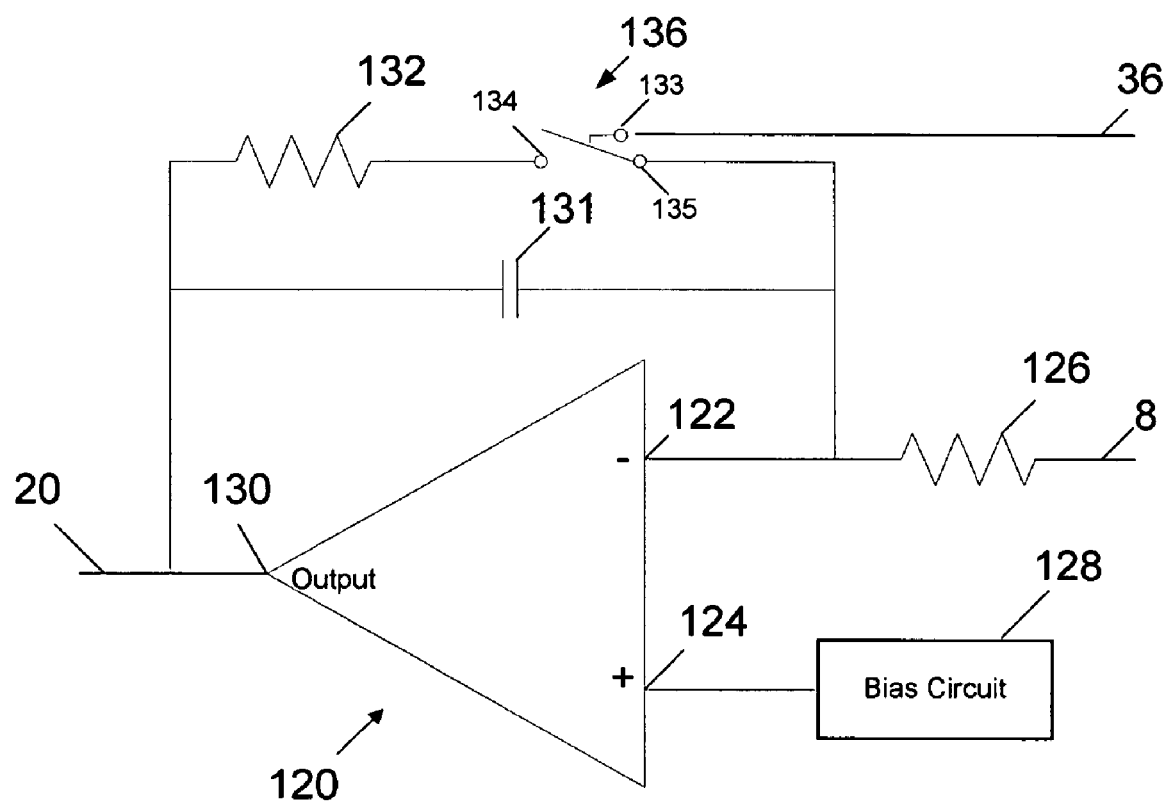
FIG. 4 is a circuit schematic of an embodiment of an integral circuit of the embodiment of FIG. 1.

An operational amplifier, shown in FIG. 4 and indicated generally by reference numeral 120, has an inverting input 122, a non-inverting input 124 and an output 130. A resistor 126 is connected between sample signal 8 and the inverting input 122. A capacitor 131 is connected between the inverting input 122 and the output 130. A resistor 132 is connected between the output 130 and a switch, indicated generally by reference numeral 136. The switch 136 in the present embodiment is an analog switch. Analog switches are commonly known in the industry, an example of which is part number CD74HC4016 manufactured by Texas Instruments Inc. The switch 136 has a first terminal 134, a second terminal 135 and a control terminal 133. The first terminal 134 is connected to resistor 132. The second terminal 135 is connected to the inverting input 122. The control terminal 133 receives control signal 36. The output 130 provides the integral signal 20. A bias circuit 124 serves to provide a DC bias voltage to output 130.

When control signal 36 has the high value and the control system is in the first operational mode, the first terminal 134 and second terminal 135 are shorted. This effectively causes the integral signal 20 to be directly proportional to the sample signal 8 by a proportionality factor equal to a ratio of the value of resistor 132 to the value of resistor 126. Typically, the value of resistor 132 Is much smaller than the value of resistor 126, for example by a factor of 500. Thus, the integral signal is effectively reduced to a zero value.

Furthermore, the value of an RC time constant formed by resistor 132 and capacitor 131 is small enough, for example about 4.3 ms, to keep capacitor 131 from accumulating charge.

When the control signal 36 has the low value and the control system is in the second operational mode, the first terminal 134 and the second terminal 135 are open circuit. This effectively cancels resistor 132 from affecting the integral signal 20. The operational amplifier 120, capacitor 131 and resistor 126 are now configured in an integrating amplifier configuration as is commonly known in the industry. As such, the integral signal 20 now is related to the sample signal 8 by a time integral of the sample signal 8.

In practice, the control signal 36 is used to disable the integral circuit 14, shown in FIG. 4, from integrating the sample signal 8. The control signal 36 selects between the first and second operational modes relative to the value of the sample signal 8 in relation to the threshold signal 105, as shown in FIG. 3. Since the sample signal 8 is representative of the output signal 4, whenever the output signal 4 is below a nominal value the integral circuit 14 will not integrate. This is particularly advantageous during electric generator start-up. Referring to FIG. 1, consider integral circuit 14 integrating the sample signal 8 during startup. The rate of integration of sample signal 8 is greater than the rate of increase of the sample signal and the output signal 4. The rate of integration for integral circuit 14 is determined by what is required for an optimal feedback loop in the control system 2. However, the rate of output signal 4 build-up during start-up is slow because it is limited by the start-up and acceleration of the prime mover of the electric generator that is mechanically driven. Without disabling the integration of the integral circuit 14, the output signal 4 would overshoot its set-point value to excessively high values. This overshoot may damage output rectifiers, filter capacitors and other electrical components that are part of the load.

Figure 5:
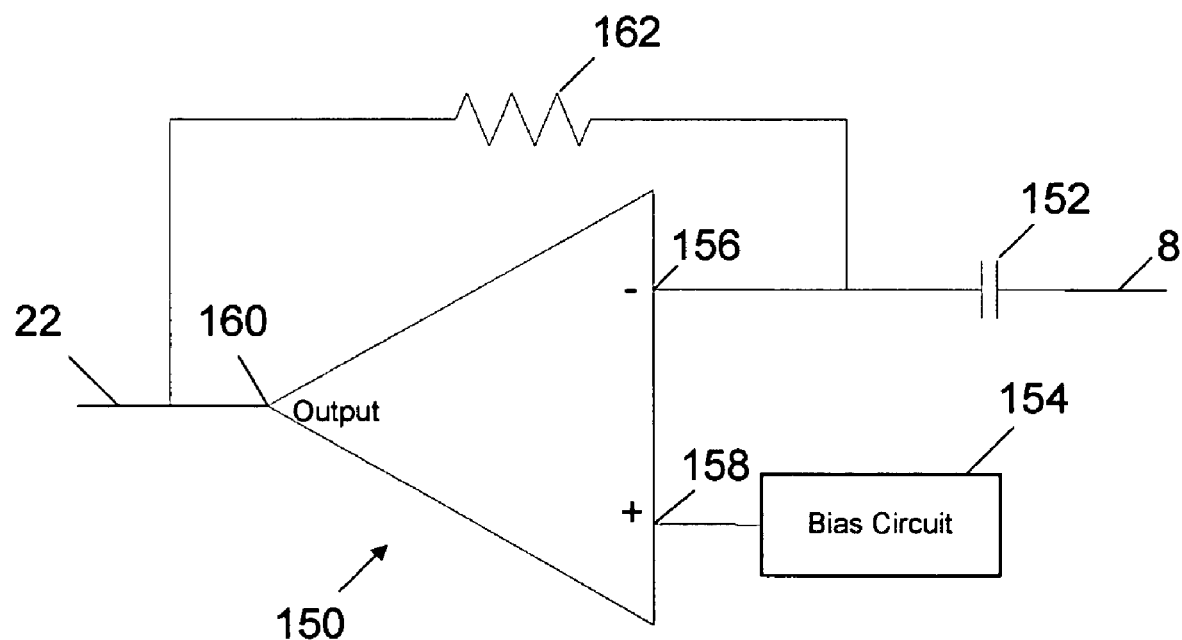
FIG. 5 is a circuit schematic of an embodiment of the differential circuit of the embodiment of FIG. 1.

The derivative means 16, as shown in FIG. 1, receives the sample signal 8 and provides a differential signal 22. The differential signal 22 is representative of a time differential of the sample signal 8. In the present embodiment the structure of the integral circuit is illustrated in FIG. 5. In the present embodiment the derivative means 16 is a derivative circuit having a structure illustrated in FIG. 5. In other embodiments the derivative means 16 can be a derivative algorithm executed in the controller.

An operational amplifier, shown in FIG. 5 and indicated generally by reference numeral 150, has an inverting input 156, a non-inverting input 158 and an output 160. A capacitor 152 is connected between sample signal 8 and the inverting input 156. A resistor 162 is connected between inverting input 156 and the output 160. The output 160 provides the differential signal 22. A bias circuit 154 is connected to the non-inverting input 158. The bias circuit 154 provides a DC bias voltage to the differential signal 22.

A reference signal means 28, as shown in FIG. 1, provides the reference signal 24. The reference signal is representative of the set-point value of the system variable. In the present embodiment the system variable is the output signal 4. The reference signal means 28 in the present embodiment comprises a voltage reference. Voltage references are commonly known in the industry, and as such they are not discussed in detail herein. In brief, the voltage reference accepts a range of input voltages and provides a specific output voltage that is stable over the range of input voltages and temperature. In other embodiments the reference signal means 28 can be a digital reference signal in a controller.

The non-linear means 32 provides a non-linear signal 34. The non-linear signal 34 is related to non-linear effects of the electric generator 1. In the control system 2 the non-linear signal 34 is used to cancel out the non-linear effects of the generator. In the present embodiment the non-linear means 32 is a non-linear circuit having a structure illustrated in FIG. 11 and discussed below. In other embodiments the non-linear means 32 can be a non-linear algorithm executed in the controller. The non-linear aspect of the electric generator to which the non-linear signal 34 is related, and in effect cancels out, relates to two separate effects.

Figure 15:
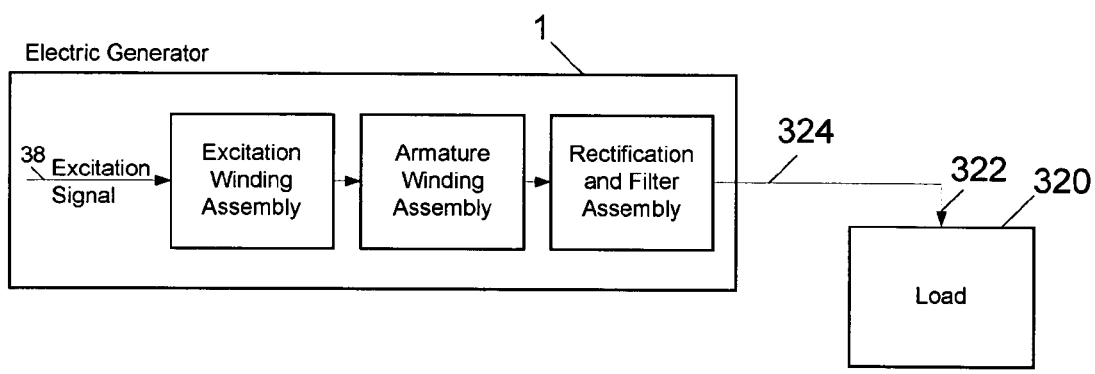
FIG. 15 is a block diagram of an electric generator of the embodiment in FIG. 1 with a load.

The first non-linear aspect of the electric generator is a gain coefficient of the electric generator. Referring to FIG. 15, the gain coefficient is expressed in terms of an output current 322 divided by an excitation current 38 at a fixed output voltage 324. A plot of output current 322 versus excitation current 38 reveals that the slope is approximately twice as steep for values of output current 322 from 0–20% as compared to values of output current from 80%–100%. The slope smoothly curves for the 20% to 80% output current 322 range. The table below illustrates the required excitation current 38 values for the corresponding output current 322 values. Accordingly, the electric generator 1 is more sensitive to changes in excitation current 38 when it is under light loads, compared to being at or near full load.

| Excitation Current (amps) | Output Current (amps) |
|---|---|
| 2.5 | 0.002 |
| 2.84 | 2 |
| 3.2 | 4 |
| 3.62 | 6 |
| 4.08 | 8 |
| 4.55 | 10 |
| 5.07 | 12 |
| 5.65 | 14 |

The second non-linear aspect of the electric generator 1 comes as a side-effect to AC power rectification and capacitor filtering. The electric generator 1 produces an AC voltage that is rectified and then capacitively filtered to provide a DC output voltage. Under light load conditions the DC output voltage of electric generator 1 has a slower response time to small changes in load, and in particular to decreasing loads. This is due to a large value of capacitance on the DC output for filtering AC ripple relative to the high value of resistance of a light load. In practice it is necessary to reduce error amplifier feedback gain because of this additional phase lag at light loads, to keep adequate control loop stability.

Figure 11:
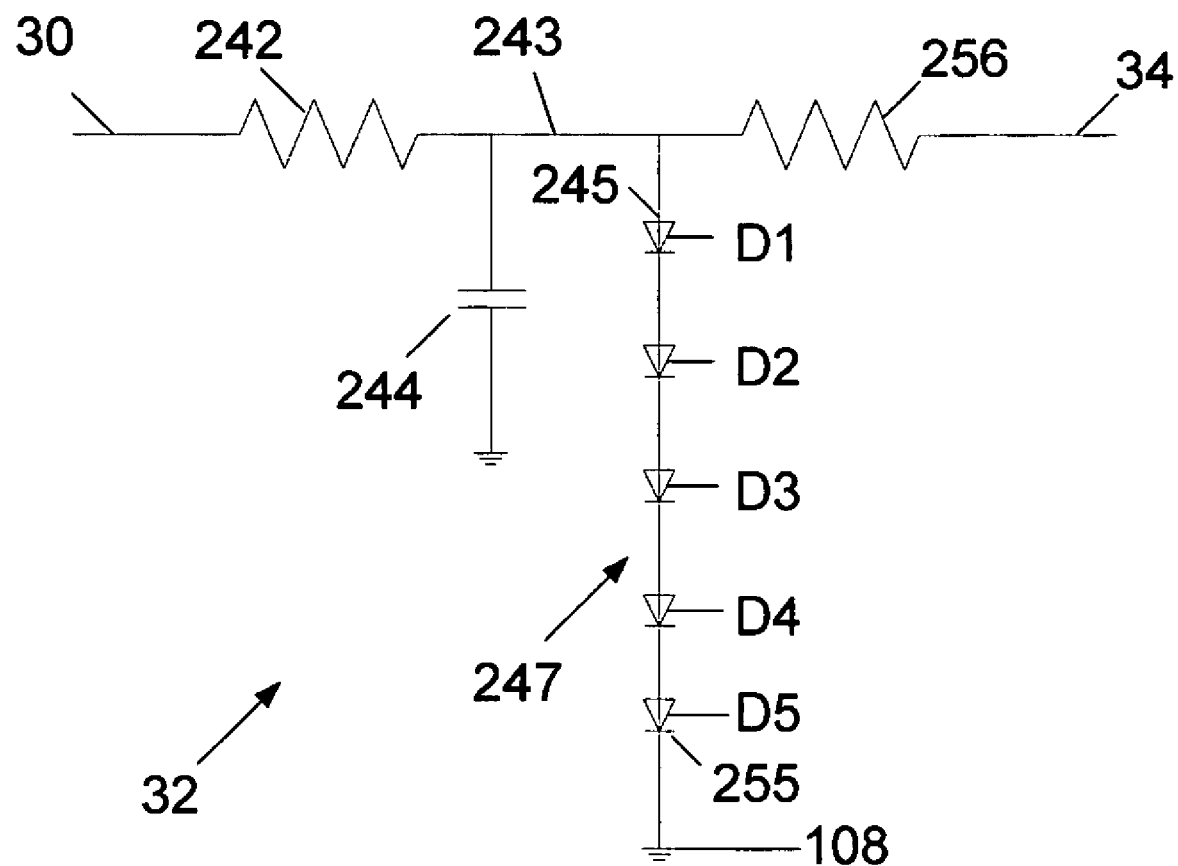
FIG. 11 is a circuit schematic of an embodiment of the non-linear circuit of the embodiment of FIG. 1.

Now referring to FIG. 11, the non-linear circuit shown generally by reference numeral 32, comprises a low pass filter formed by a resistor 242 connected between an error signal 30 and a capacitor 244. The capacitor 244 is further connected to ground 108. A diode ladder, indicated generally by reference numeral 247, is formed by diodes D1, D2, D3, D4, and D5 all connected in a forward direction. The diode ladder 247 effectively forms a super diode structure having an anode 245 and cathode 255. The super diode structure also has a corresponding threshold voltage across the anode 245 and cathode 255 at which it begins to conduct current. The anode 245 is connected to capacitor 244 and cathode 255 is connected to ground 108. A resistor 256 is connected between the anode 245 and the non-linear signal 34.

The error signal 30 is low-pass filtered by resistor 242 and capacitor 244 and forms a voltage signal 243. The voltage signal 243 causes a current to flow through the diode ladder 247 and the resistor 256. The resistor 256 has a relatively large value, for example 86 kohms, and as such the current through the resistor 256 is relatively small compared to the current through the diode ladder 247. The diode ladder 247 begins to clamp the voltage signal 243 above the diode threshold voltage. This corresponds to a level just above the level of minimal excitation current to sustain generator output signal 4 at the set-point value. The diode clamping effect is gentle at first and becomes more pronounced as the current in the diode ladder 247 increases, making use of the inherent non-linear relationship between diode voltage and current. The voltage signal 243 therefore has a non-linear relationship with error signal 30. The non-linear signal 34 is directly proportional to the voltage signal 243, and accordingly the non-linear signal 34 has a non-linear relationship with the error signal 30 as well. The non-linear signal 34 simulates the combined non-linear effects of decreasing generator gain coefficient and decreasing small-signal phase lag through a rectifier capacitor circuit.

An error generating means 26, shown in FIG. 1, provides the error signal 30. The error signal 30 is representative of a difference between the reference signal 24 and a sum of the proportional signal 18, the integral signal 20, the differential signal 22, and the non-linear signal 34. The non-linear signal 34 is related to the error-signal by a non-linear function. In the present embodiment the error generating means 26 is an error generating circuit. The error generating circuit has a summing circuit and a differencing circuit illustrated by FIGS. 12 and 13 respectively. In other embodiments the error generating means 26 can be an error generating algorithm executed in the controller.

Figure 12:
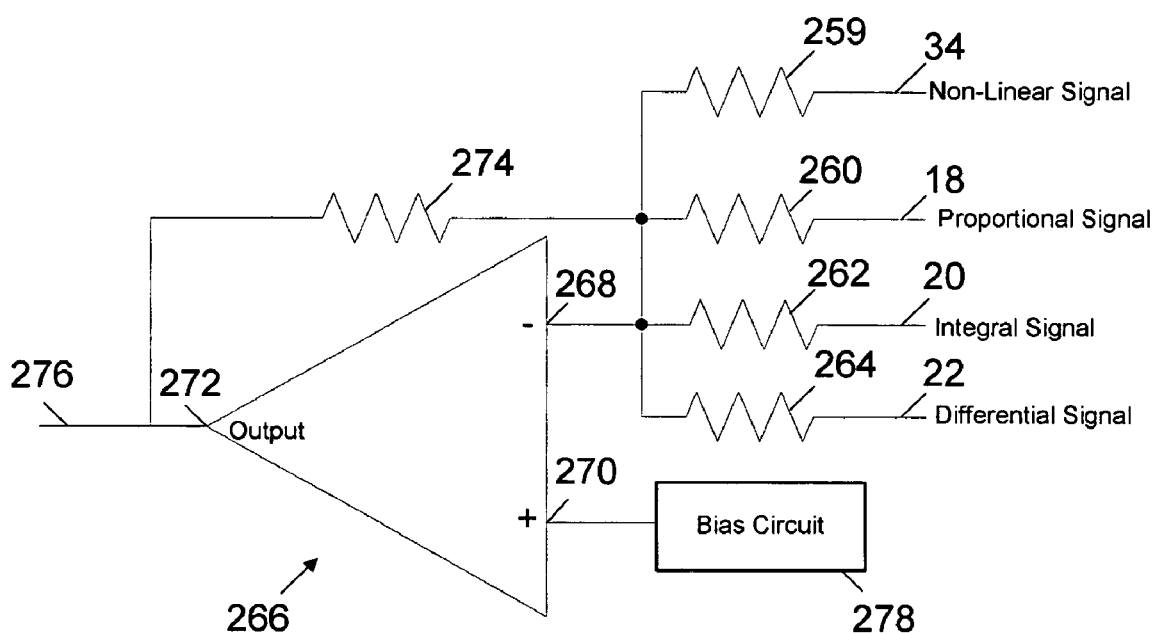
FIG. 12 is a circuit schematic of an embodiment of a summing circuit in an error generating circuit of the embodiment of FIG. 1.

FIG. 12 illustrates the summing circuit that provides a sum 276 of the proportional signal 18, the integral signal 20, the differential signal 22, and the non-linear signal 34. An operational amplifier, indicated generally by reference numeral 266, has an inverting input 268, a non-inverting input 270 and an output 272. A resistor 259 is connected between the non-linear signal 34 and the inverting input 268. A resistor 260 is connected between the proportional signal 18 and the inverting input 268. A resistor 262 is connected between the integral signal 20 and the inverting input 268. A resistor 264 is connected between the differential signal 22 and the inverting input 268. A resistor 274 is connected between the inverting input 268 and the output 272. A bias circuit 278 is connected to the non-inverting input 270. The output 272 provides the sum 276. The bias circuit 278 is operable to provide a DC bias voltage to the sum 276. Since the resistors 259, 260, 262, 264, and 274 are of equal value, the output 272 equals the sum of the non-linear signal 34, the proportional signal 18, the integral signal 20, and the differential signal 22.

Figure 13:
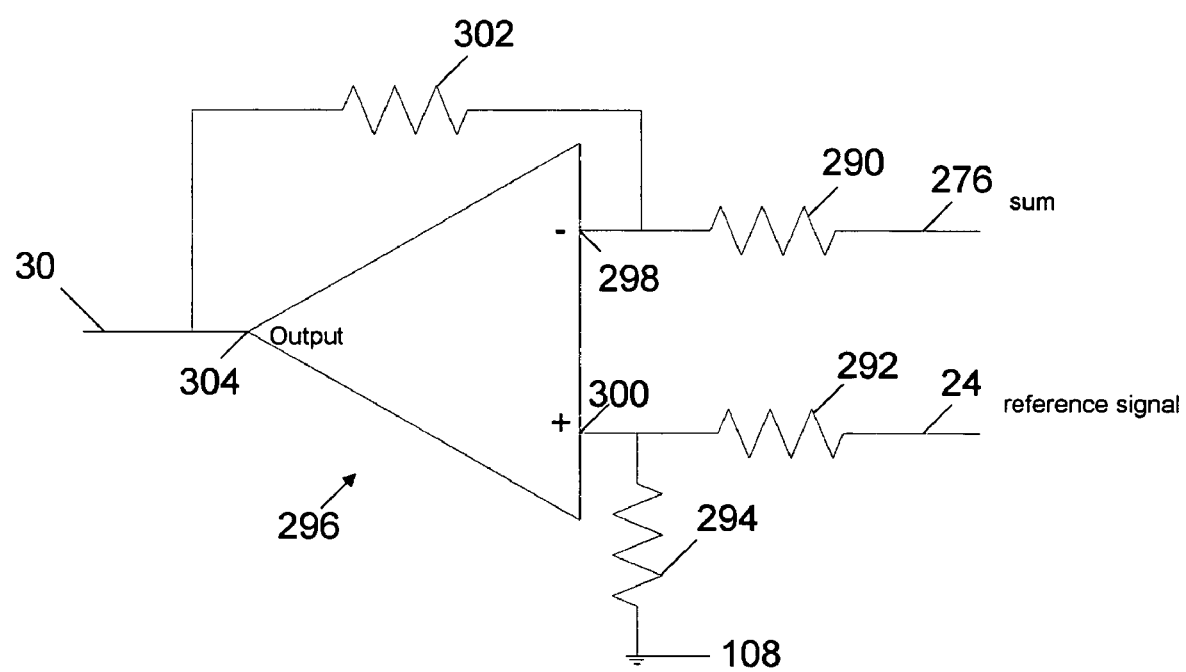
FIG. 13 is a circuit schematic of an embodiment of a differencing circuit in an error generating circuit of the embodiment of FIG. 1.

FIG. 13 illustrates the differencing circuit that provides the difference between the sum 276 and the reference signal 24. An operational amplifier, indicated generally by reference numeral 296, has an inverting input 298, a non-inverting input 300 and an output 304. Resistor 290 is connected between the sum 276 and the inverting input 298. A resistor 302 is connected between the inverting input 298 and the output 304. A resistor 292 is connected between the reference signal 24 and the non-inverting input 300. A resistor 294 is connected between the non-inverting input 300 and ground 108. The output 304 provides the error signal 30. Since the resistors 290, 292, 294 and 302 are equal, the error signal 30 equals the difference between the reference signal 24 and the sum 276.

Referring again to FIG. 1, the electric generator 1 receives the error signal 30 and adjusts the output signal 4 such that it approaches the set-point value. The error signal will adjust an excitation field energy of the electric generator 1 up or down, which affects the generated output signal 4 accordingly. When the difference between the reference signal 24 and the sum of the proportional signal 18, the integral signal 20, the differential signal 22, and the non-linear signal 34 has a zero value then the output signal 4 equals the set-point value.

Figure 2:
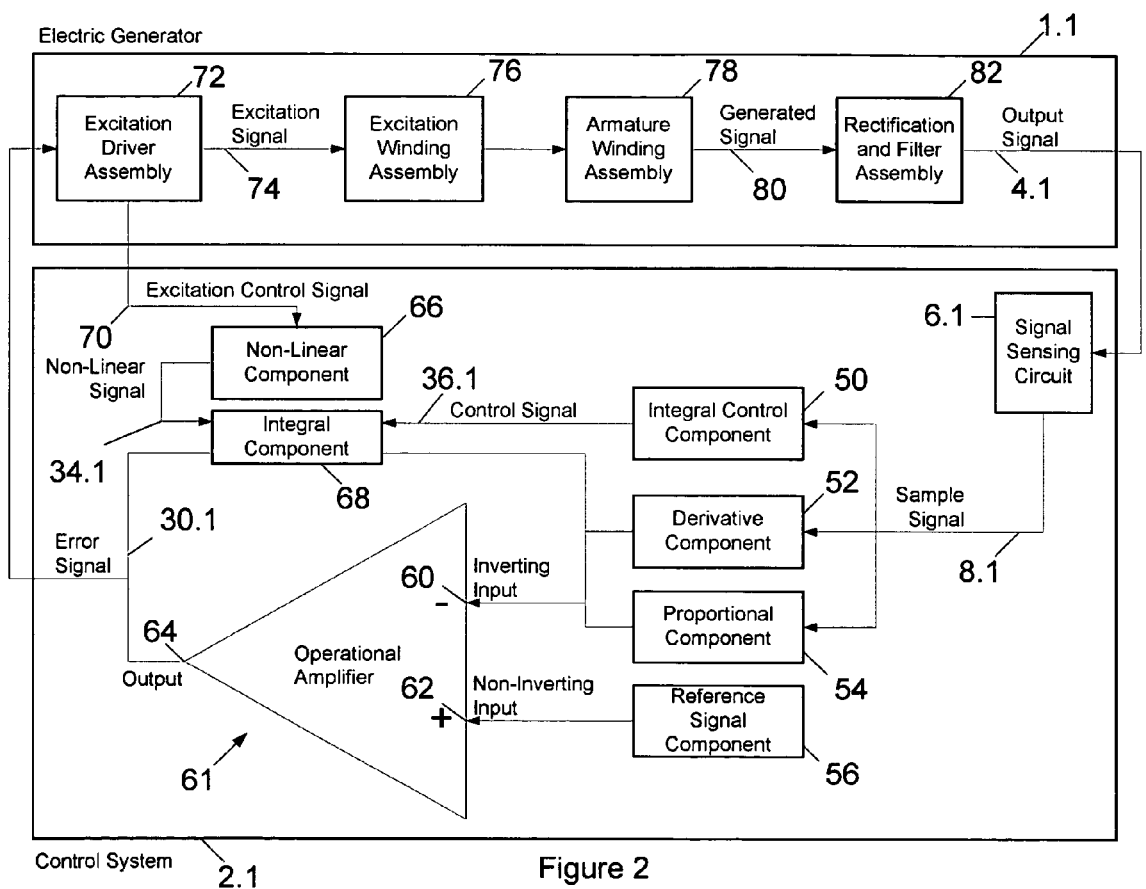
FIG. 2 is a block diagram of another preferred embodiment of the control system and electric generator.

Another embodiment of the present invention is illustrated in FIG. 2 wherein like parts to FIG. 1 have like reference numerals followed by ".1". FIG. 2 shows an electric generator 1.1 and a control system 2.1 for adjusting the value of a system variable, the system variable having a set-point value. In the present embodiment, the system variable is output signal 4.1, which is a DC voltage. This embodiment has the advantage of using a single operational amplifier for the proportional, integrating and differentiating functions of a PID control element in a feedback loop of the control system. Furthermore, as will be discussed below in greater detail, a non-linear signal 34.1 serves to adjust the proportional, integrating and differentiating functions of the control system under changing load conditions.

The electric generator 1.1 comprises an excitation driver assembly 72, an excitation winding assembly 76, an armature winding assembly 78 and a rectification and filter assembly 82.

The excitation driver assembly 72 provides an excitation control signal 70 and an excitation signal 74. The excitation signal 74 is a high current signal that serves to provide an excitation field for the electric generator. The excitation control signal 70 is a voltage signal that creates the excitation signal 74.

The excitation winding assembly 76 receives the excitation signal 74 and provides the excitation field. The excitation field is an alternating magnetic field.

The armature winding assembly 78 couples the energy from the excitation field and provides a generated signal 80. The generated signal 80 is an AC voltage signal.

The rectifier and filter assembly 82 receives the generated signal 80 and provides the output signal 4.1. The rectifier and filter assembly 82 is operable to rectify generated signal 82 providing output signal 4.1, and consequently filtering the output signal 4.1.

A signal sensing circuit 6.1 receives the output signal 4.1 and provides a sample signal 8.1. The sample signal 8.1 is proportional to the output signal 4.1. The structure of the signal sensing circuit 6.1 in this embodiment can be the same as the structure of the signal sensing circuit 7 in FIG. 8 discussed above.

The sample signal 8.1 is processed by a unique circuit configuration centered around an operational amplifier indicated generally by reference numeral 61, as shown in FIG. 2. The operational amplifier 61 has an inverting input 60, a non-inverting input 62 and an output 64.

Figure 7A:
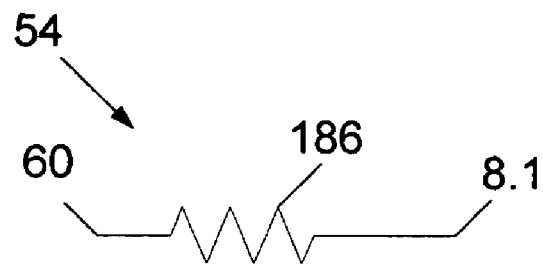
FIG. 7A is a circuit schematic of a proportional component of the embodiment of FIG. 2.

A proportional component 54 is connected between the sample signal 8.1 and the inverting input 60, the proportional component having a resistive impedance. As shown in FIG. 7A, the proportional component, indicated generally by reference numeral 54, in the present embodiment is a resistor 186.

An integral control component 50, as shown in FIG. 2, receives the sample signal 8.1 and provides a control signal 36.1. The control signal 36.1 selects between a first operational mode and a second operational mode. In the present embodiment, the integral control component 50 can have the same structure as shown in FIG. 3 and discussed above.

Figure 7B:
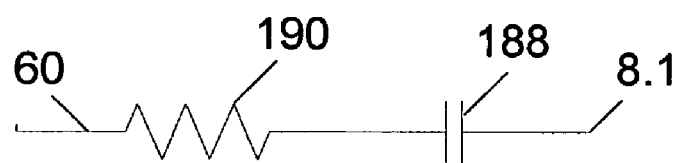
FIG. 7B is a circuit schematic of a derivative component of the embodiment of FIG. 2.

Referring again to FIG. 2, a derivative component 52 is connected between the sample signal 8.1 and the inverting input 60. As shown in FIG. 7B, the derivative component, indicated generally by reference numeral 52, has a complex impedance. A capacitor 188 is connected between the sample signal 8.1 and a resistor 190. The resistor 190 is connected further to the inverting input 60.

A nonlinear component 66, as shown in FIG. 2, receives the excitation control signal 70 and provides a nonlinear signal 34.1. The nonlinear component 66 can have the same structure as shown in FIG. 11 and discussed above. In the present embodiment, instead of the nonlinear component 66 receiving the error signal 30 shown in FIG. 1, the nonlinear component 66 receives the excitation control signal 70 shown in FIG. 2.

Referring to FIG. 2, an integral component 68 is connected between the output 64 and the inverting input 60. The integral component 68 further receives the non-linear signal 34.1 and the control signal 36.1. The integral component 68 has an adjustable impedance.

Figure 7C:
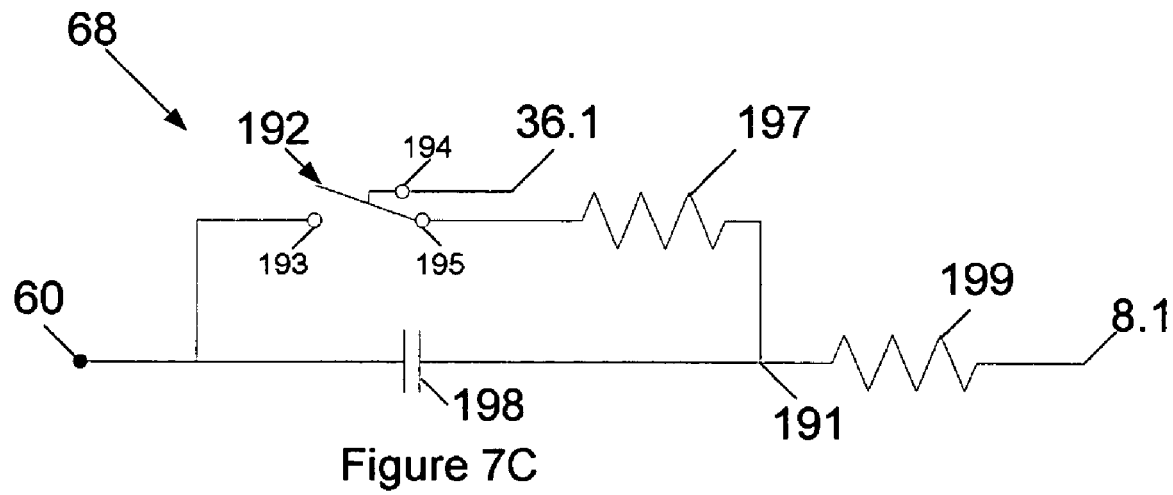
FIG. 7C is a circuit schematic of a integral component of the embodiment of FIG. 2.

FIG. 7C shows the integral component indicated generally by reference numeral 68. A resistor 199 is connected between the sample signal 8.1 and a node 191. A capacitor 198 is connected between node 191 and inverting input 60 (represented as a dot in FIG. 7C). A resistor 197 is connected between node 191 and a terminal 195 of a switch indicated generally by reference numeral 192. Switch 192 in the present embodiment can be the analog switch discussed above in relation to switch 136 of FIG. 4. Referring to FIG. 7C, a terminal 193 of switch 192 is connected to the inverting input 60. A control terminal 194 is connected to the control signal 36.1.

Figure 16:
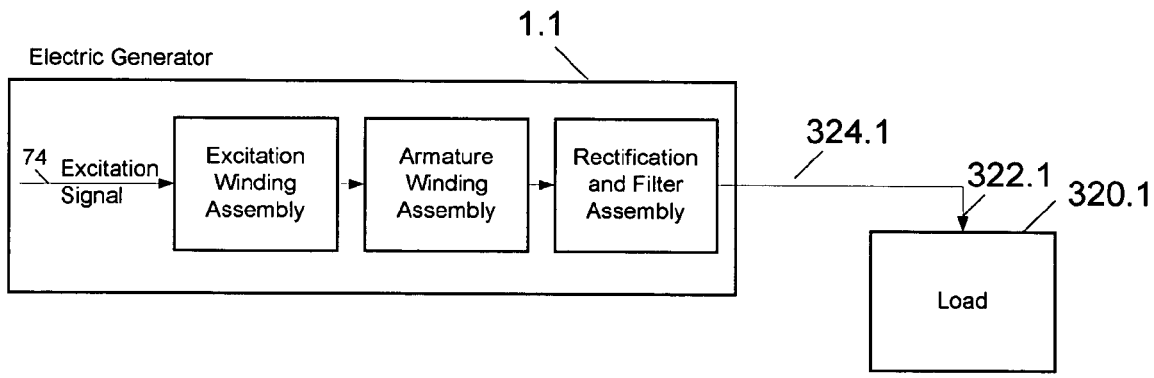
FIG. 16 is a block diagram of an electric generator of the embodiment in FIG. 2 with a load.

The advantages of the non-linear signal 34.1 are discussed below. First, the concept of a load, as shown in FIG. 16, is introduced. The electric generator 1.1 provides an output voltage 324.1 for a load 320.1. The output voltage 324.1 applied to the load 320.1 causes a current 322.1 to flow from the electric generator 1.1 to the load 320.1. The load 320.1 can vary in that the current 322.1 may be small, for example less than 100 mA, or large, for example greater than 10 A. The electric generator has a range of loads, the range having a minimum load and a maximum load. The minimum load corresponds to a smallest continuous value for current 322.1, in the present embodiment 2 mA. The maximum load corresponds to a maximum continuous value for current 322.1, in the present embodiment 15 A. Small values for current 322.1 correspond to small values for excitation signal 74.1.

The advantages of the non-linear signal 34.1 are now discussed. As discussed above in relation to the first embodiment, the non-linear signal 34.1 is used to model and effectively cancel two non-linear effects in the generator. The first has to do with the gain coefficient of the electric generator 1.1. Referring to FIG. 16, the electric generator 1.1 has a gain corresponding to a ratio of the output current 322.1 to the excitation signal 74 for a fixed output voltage 324.1. The gain changes over a range of loads and is higher for small values of current 322.1 and correspondingly excitation signal 74. The second non-linear effect is related to a slower response of the output voltage 324.1 under light load conditions to small changes in load, and in particular to decreasing loads. This is due to a large value of capacitance on the output signal 4.1 for filtering AC ripple voltage relative to a high value of resistance of a light load.

Again referring to FIG. 2, in order to maintain optimal feedback loop damping over the range of loads it is necessary to adjust the proportional component 54, integral component 68 and the derivative component 52 in relation to the gain of the electric generator. Feedback loop damping in the control system 2.1 refers to optimization of a transient response of the control system 2.1 to changes in load, over the range of loads. If the response is too slow, the output signal 4.1 takes too much time to return to the set-point value. If the response is too fast, the output signal 4.1 oscillates, or rings, around the set-point value.

In the present embodiment, the non-linear signal 34.1 injected into the integral component 68 adjusts the components 54, 68 and 52 such that the gain of the control system 2.1 is decreased at smaller values of excitation signal 74. This has the advantage of optimizing the feedback loop damping of the control system over the range of loads. Without this improvement to conventional PID control one would have to set a fixed single low-value gain level for all amounts of load. This results in slow transient response to sudden changes in load.

Figure 14:
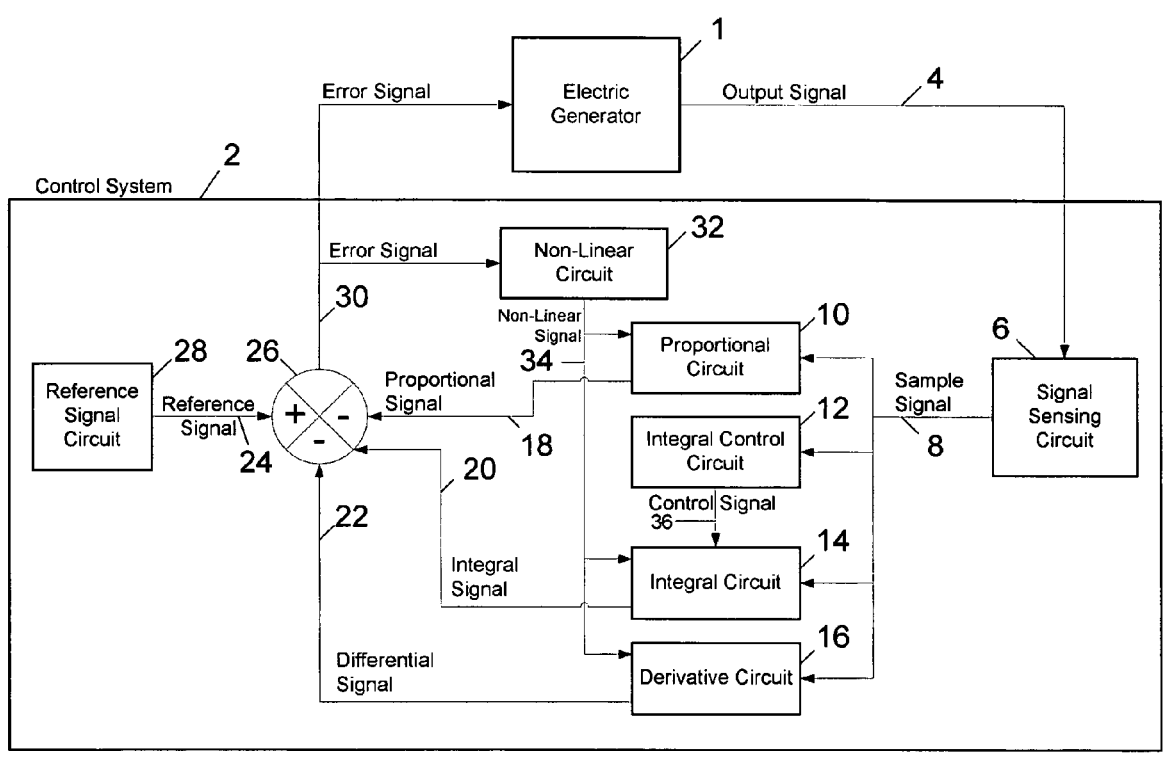
FIG. 14 is a block diagram of another embodiment of the invention.

In the present embodiment, the components 54, 68 and 52 are adjusted such that frequency break-points remain the same. The frequency break-points are the frequencies at which the control system transfer function changes from being integrative to proportional and from being proportional to differential. The non-linear signal may be injected into each component individually, as shown in FIG. 14. This allows components 54, 68 and 52 to be adjusted separately for more advanced feedback loop damping in which the frequency break-points change at different levels of load.

Referring again to FIG. 2, a reference signal component 56 is connected to the non-inverting input 56. This provides a DC bias signal component to error signal 30.1.

The output provides the error signal 30.1 to the excitation assembly 72. The excitation assembly 72 correspondingly adjusts the excitation signal 74 that is received by the excitation winding assembly 76, such that the output signal 4.1 varies so that the system variable approaches the set-point value.

Figure 17:
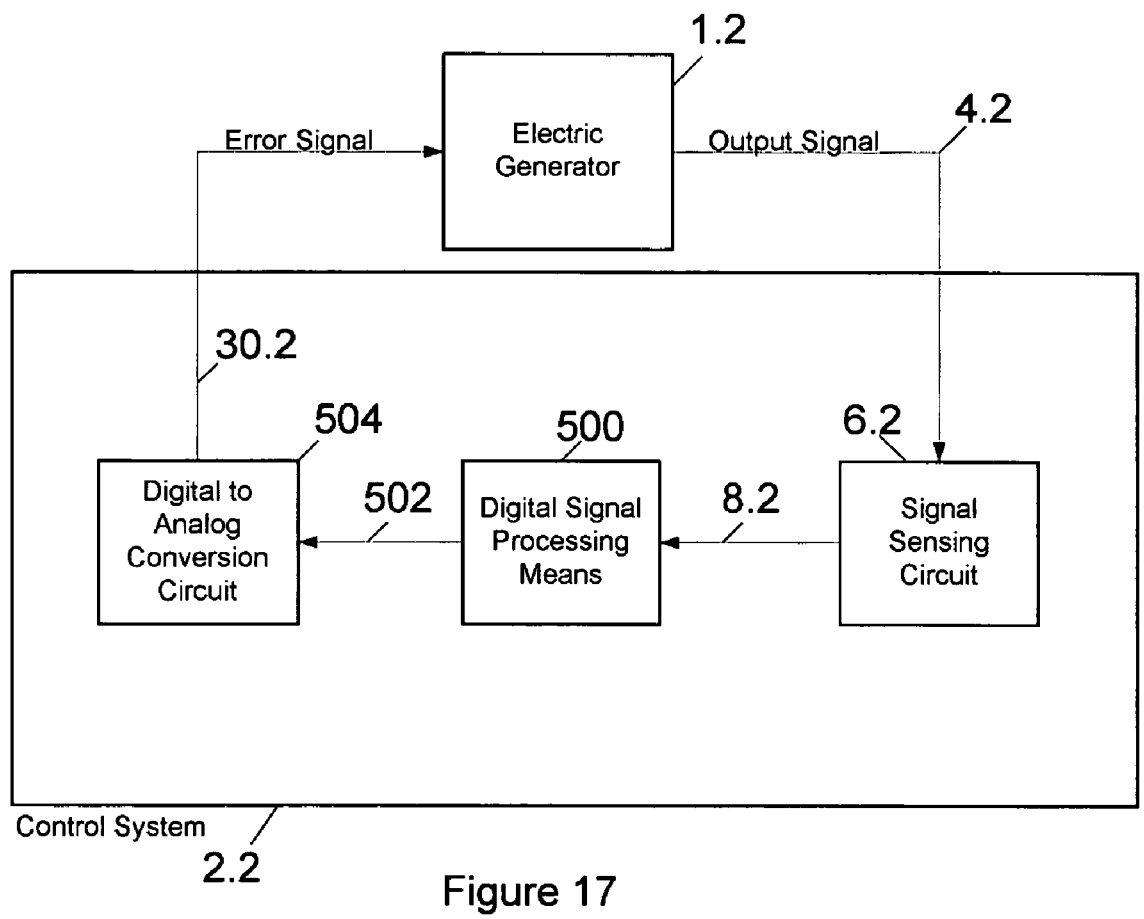
FIG. 17 is a block diagram of another embodiment of the control system and electric generator.

Another embodiment of the present invention is illustrated in FIG. 17 wherein like parts to FIG. 1 have like reference numerals followed by ".2". In the above embodiments, the control systems 2 and 2.1 were completely in the analog domain. In the present embodiment control system 2.2 performs the control functions in the digital domain.

Signal sensing circuit 6.2 provides a digital sample signal 8.2 that is a digital representation of output signal 4.2. Digital signal processing means 500 receives the digital sample signal 8.2.

The digital signal processing means 500 includes a proportional means, an integral means, a derivative means, an integral control means, a non-linear means, a reference signal means and an error generating means. In the present embodiment the proportional means includes a proportional algorithm, the integral means includes an integral algorithm, the derivative means includes a derivative algorithm, the integral control means includes an integral control algorithm, the non-linear means includes a non-linear algorithm, the reference signal means includes a digital reference signal and the error generating means includes an error generating algorithm.

The digital signal processing means 500 typically further includes a controller attached to a memory. The memory stores the proportional algorithm, the integral algorithm, the derivative algorithm, the integral control algorithm, the non-linear algorithm, the digital reference signal and the error generating algorithm. The controller executes the proportional algorithm, the integral algorithm, the derivative algorithm, the integral control algorithm, the non-linear algorithm and the error generating algorithm. The digital signal processing means 500 provides a digital error signal 502.

A digital to analog conversion circuit 504 receives the digital error signal 502 and provides an analog error signal 30.2. The electric generator receives the error signal 30.2 and adjusts the output signal 4.2 towards the set-point value accordingly.

In the foregoing embodiments, the various signals used in the control systems 2, 2.1 and 2.2 have generally been voltage signals, current signals or digital signals. It is understood by those familiar with the art that it is common in electronics to convert back and forth between different types of signals, such as between voltage, current, frequency, pulse duty-cycle, phase, digital and amplitude signals. As such, the circuits described in the above embodiments may be commonly modified to receive one or more of the different signal types and provide one or more of the different signal types. These different circuits may still provide similar results as the embodiments above.

As will be apparent to those skilled in the art, various modifications may be made within the scope of the appended claims.

What is claimed is:

1. A closed loop control system that controls an output voltage of an electric generator, the closed loop control system having a feedback loop, the feedback loop having an output voltage feedback signal and an adjustable integral component, the output voltage feedback signal being responsive to the output voltage, the adjustable integral component being responsive to the output voltage feedback signal and providing an integral signal, the adjustable integral component having an adjustable impedance and means to select between a first operational mode and a second operational mode, the adjustable impedance having a first impedance in the first operational mode and a second impedance in the second operational mode, the integral signal being directly proportional to the output voltage feedback signal in the first operational mode, the integral signal being proportional to a time integral of the output voltage feedback signal in the second operational mode.

2. The closed loop control system of claim 1 wherein the adjustable impedance is substantially resistive in the first operational mode, and the adjustable impedance is capacitive in the second operational mode.

3. The closed loop control system of claim 1 wherein
the means to select includes a switch and the adjustable impedance includes a resistive impedance and a capacitive impedance, the switch having a shorted configuration and an open configuration, the resistive impedance being in series with the switch and the capacitive impedance being in parallel with the switch and the resistive impedance, the adjustable impedance being in the first operational mode in the shorted configuration, the adjustable impedance being in the second operational mode in the open configuration.

4. The closed loop control system of claim 1 wherein the means to select includes a control component, the control component receiving the output voltage and providing a control signal, the control signal being operable to select between the first operational mode and the second operational mode.

5. The closed loop control system of claim 4 wherein the control component further includes a comparator, the comparator receiving the output voltage and a threshold signal and providing the control signal, the control signal selecting the first operational mode when the output voltage is less than the threshold signal, the control signal selecting the second operational mode when the output voltage is greater than the threshold signal.

6. The closed loop control system of claim 1 wherein the feedback loop includes a non-linear component and provides an error signal, the electric generator being responsive to the error signal to adjust the output signal voltage, the electric generator having non-linear characteristics, the non-linear component being responsive to a load signal and providing a non-linear signal related to the non-linear characteristics of the electric generator, the error signal being responsive to the nonlinear signal.

7. The closed loop control system of claim 6 wherein the non-linear component includes a diode ladder, the diode ladder comprising a network of diodes connected in series such that a threshold voltage related to the load signal forward biases the network of diodes.

8. The closed loop control system of claim 6 wherein the load signal is a current through a load.

9. The closed loop control system of claim 6 wherein the load signal is a current through an excitation winding.

10. The closed loop control system of claim 6 wherein the load signal is a pulse width modulated excitation voltage.

11. The closed loop control system of claim 6 wherein the non-linear characteristics of the generator includes a generator gain coefficient, the generator gain coefficient being a ratio of an output current to an excitation current for a fixed output voltage, the generator gain coefficient being non-linear across a range of loads.

12. The closed loop control system of claim 6 wherein the non-linear characteristics of the generator includes a phase lag in the output voltage during a transient load condition, the phase lag being non-linear across a range of loads.

13. The closed loop control system of claim 1 wherein the feedback loop includes a derivative component providing a differential signal, the differential signal being proportional to the time differential of the output voltage.

14. The closed loop control system of claim 1 wherein the feedback loop includes a proportional component providing a proportional signal, the proportional signal being proportional to the output voltage.

* * * * *